(12) United States Patent
Huang et al.

(10) Patent No.: US 11,768,397 B2
(45) Date of Patent: Sep. 26, 2023

(54) TOUCH DISPLAY PANEL AND TOUCH DISPLAY DEVICE

(71) Applicant: Wuhan Tianma Microelectronics Co., Ltd. Shanghai Branch, Shanghai (CN)

(72) Inventors: Kunxiang Huang, Shanghai (CN); Wei Liu, Shanghai (CN); Peng Zhang, Shanghai (CN)

(73) Assignee: Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 0 days.

(21) Appl. No.: 18/146,566

(22) Filed: Dec. 27, 2022

(65) Prior Publication Data

US 2023/0128245 A1    Apr. 27, 2023

(30) Foreign Application Priority Data

Oct. 25, 2022    (CN) .......................... 202211310755.2

(51) Int. Cl.
*G02F 1/1333*    (2006.01)
*G06F 3/041*    (2006.01)
*G06F 3/044*    (2006.01)

(52) U.S. Cl.
CPC ........ *G02F 1/13338* (2013.01); *G06F 3/0412* (2013.01); *G06F 3/0446* (2019.05)

(58) Field of Classification Search
CPC .......................... G06F 3/0446; G06F 3/0448
See application file for complete search history.

(56) References Cited

U.S. PATENT DOCUMENTS

2012/0306565 A1* 12/2012 Hsu ....................... G06F 3/0445
                                                                    327/517
2017/0153757 A1*  6/2017 Xing ................. G02F 1/134309

FOREIGN PATENT DOCUMENTS

CN        109766030 A    5/2019
CN        109254701 B    3/2021

* cited by examiner

*Primary Examiner* — Robin J Mishler
(74) *Attorney, Agent, or Firm* — CHRISTENSEN O'CONNOR JOHNSON KINDNESS PLLC

(57) ABSTRACT

A touch display panel has a first region and a second region. The touch display panel includes a first touch unit located in the first region, and a plurality of second touch units located in the second region, wherein the plurality of second touch units is arranged in a matrix in a first direction and a second direction, the first direction intersecting the second direction. An area of an orthographic projection of the first touch unit on a plane of the touch display panel is smaller than an area of an orthographic projection of one second touch unit of the plurality of second touch units on the plane of the touch display panel. An absolute value of a difference between an impedance of the first touch unit and an impedance of the one second touch unit is smaller than a first preset threshold.

20 Claims, 10 Drawing Sheets

TOUCH DISPLAY PANEL AND TOUCH DISPLAY DEVICE

CROSS-REFERENCE TO RELATED APPLICATIONS

The present application claims to the benefit of Chinese Patent Application No. 202211310755.2, filed on Oct. 25, 2022, the content of which is incorporated herein by reference in its entirety.

TECHNICAL FIELD

The present disclosure relates to the field of display technologies, and in particular, to a touch display panel and a touch display device.

BACKGROUND

With the rapid development of display technology and human-computer interaction technology, display panels with touch function have been more and more widely used. For example, in order to achieve the purpose of convenience of carrying, light weight, and small size, an input device of many electronic products, such as the mobile phone, has changed from the traditional keyboard or mice and other devices for input to the touch screen.

In order to integrate the touch function to a display panel, touch electrodes need to be provided in the display panel. How to ensure the electrical reliability of the touch electrodes, improve the ability of the touch electrodes to withstand static electricity, and avoid electrostatic damage to the touch electrodes has become the focus of relevant researchers.

SUMMARY

In a first aspect, some embodiments of the present disclosure provide a touch display panel. The touch display panel has a first region and a second region. The touch display panel includes a first touch unit located in the first region, and a plurality of second touch units located in the second region, wherein the plurality of second touch units is arranged in a matrix in a first direction and a second direction, the first direction intersecting the second direction. An area of an orthographic projection of the first touch unit on a plane of the touch display panel is smaller than an area of an orthographic projection of one second touch unit of the plurality of second touch units on the plane of the touch display panel. An absolute value of a difference between an impedance of the first touch unit and an impedance of the one second touch unit is smaller than a first preset threshold.

In a second aspect, some embodiments of the present disclosure provide a touch display device including a touch display panel. The touch display panel has a first region and a second region. The touch display panel includes a first touch unit located in the first region, and a plurality of second touch units located in the second region, wherein the plurality of second touch units is arranged in a matrix in a first direction and a second direction, the first direction intersecting the second direction. An area of an orthographic projection of the first touch unit on a plane of the touch display panel is smaller than an area of an orthographic projection of one second touch unit of the plurality of second touch units on the plane of the touch display panel. An absolute value of a difference between an impedance of the first touch unit and an impedance of the one second touch unit is smaller than a first preset threshold.

BRIEF DESCRIPTION OF DRAWINGS

In order to more clearly illustrate the embodiments of the present disclosure, the accompanying drawings used in the embodiments are briefly described below. The drawings described below are merely a part of the embodiments of the present disclosure. The accompanying drawings in the following description are some embodiments of the present disclosure, and other accompanying drawings can be obtained in accordance with these drawings for those skilled in the art.

DETAILED DESCRIPTION

For facilitating the understanding of the technical solution of the present disclosure, the embodiments of the present disclosure are described in detail below.

It should be understood that the embodiments described below are merely some of, rather than all of the embodiments of the present disclosure. On a basis of the embodiments in this disclosure, all other embodiments obtained by the ordinary skilled in the art without paying creative effort are within a protection scope of this disclosure.

The terms used in the embodiments of the present disclosure are merely for the purpose of describing specific embodiments, but not intended to limit the present disclosure. The singular forms of "a", "an" and "the" used in the embodiments of the present disclosure and the appended claims are also intended to indicate plural forms, unless clearly indicating others.

It should be understood that the term "and/or" used herein merely indicates a relationship describing associated objects, indicating three possible relationships. For example, the expression "A and/or B" indicates: A exists alone, both A and B exist, or B exists alone. In addition, the character "/" in this description generally means that the associated objects are in an "or" relationship.

Figure 1:
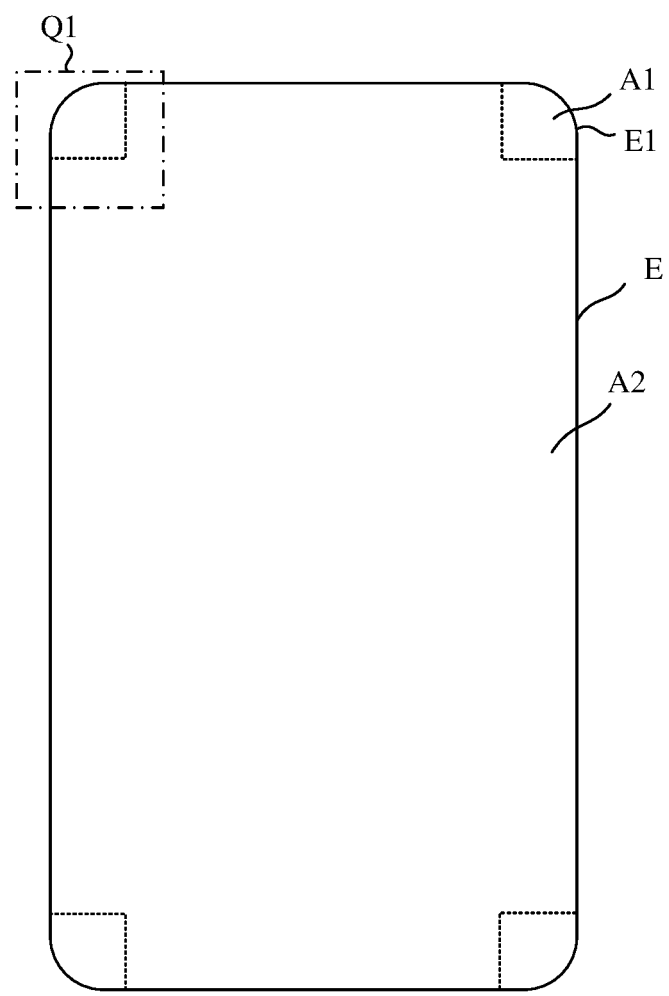
FIG. 1 is a schematic diagram of a touch display panel according to embodiments of the present disclosure.
Figure 2:
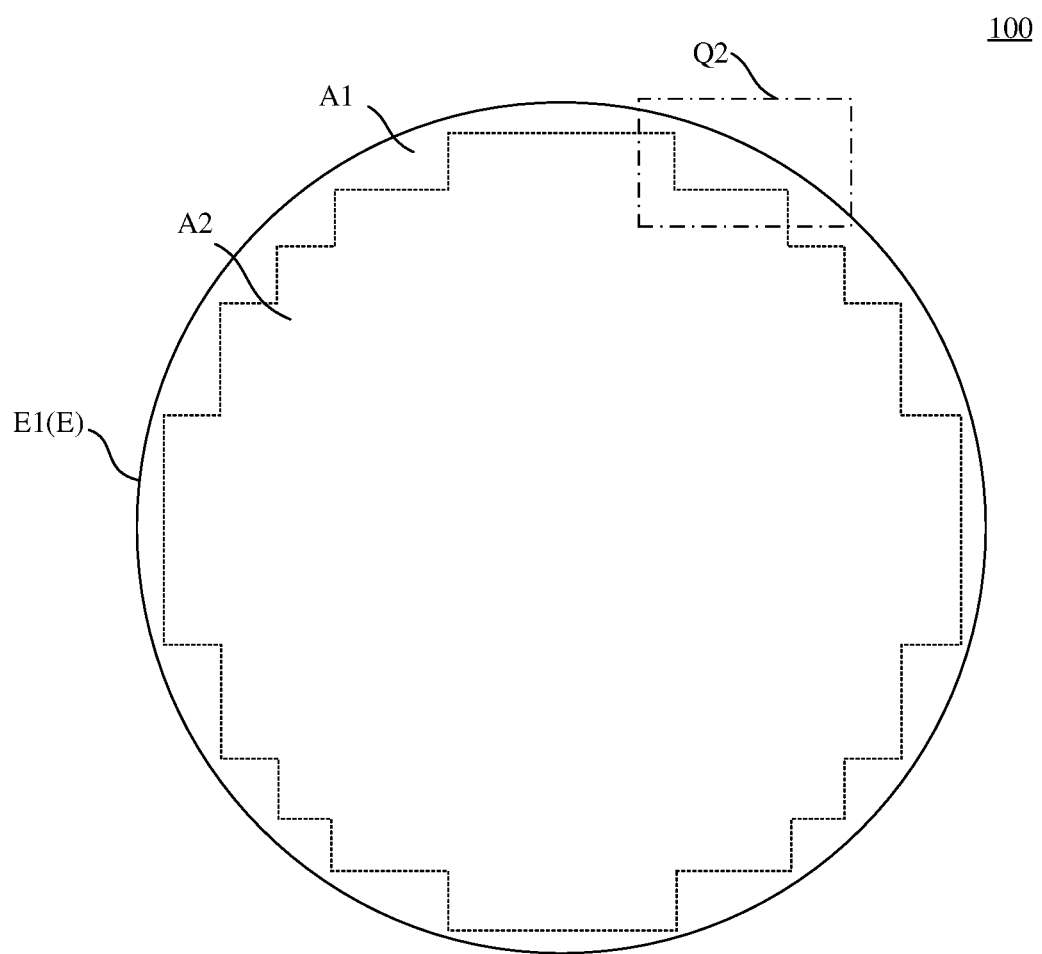
FIG. 2 is a schematic diagram of another touch display panel according to embodiments of the present disclosure.

Embodiments of the present disclosure provide a touch display panel. FIG. 1 is a schematic diagram of a touch display panel 100 according to embodiments of the present disclosure. FIG. 2 is a schematic diagram of another touch display panel 100 according to embodiments of the present disclosure. As shown in FIG. 1 and FIG. 2, the touch display panel 100 includes a first region A1 and a second region A2, and the first region A1 is located at a side of the second region A2 close to an edge E of the display panel 100.

Figure 3:
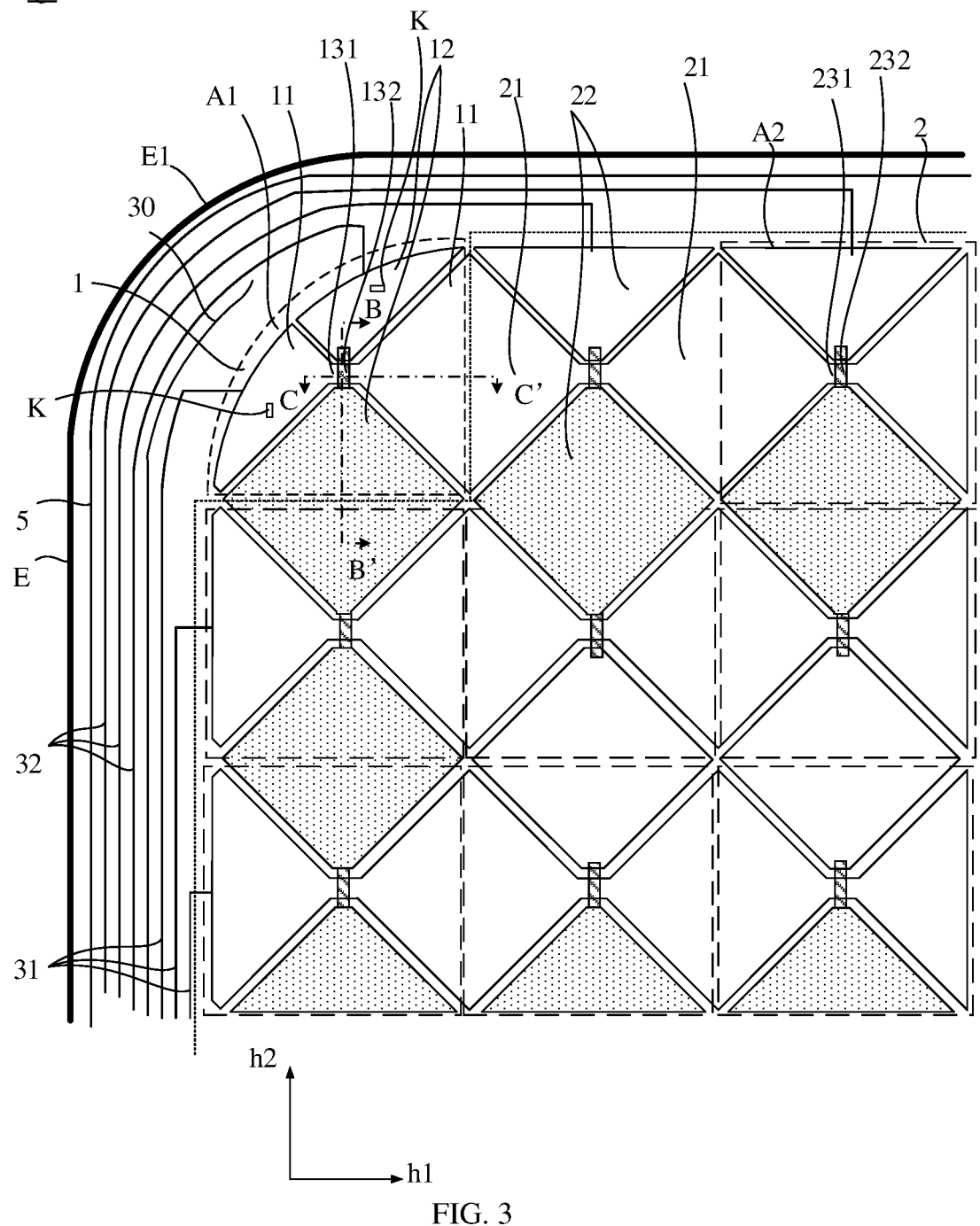
FIG. 3 is a schematic enlarged view of a region Q1 in FIG. 1 according to an embodiment of the present disclosure.
Figure 4:
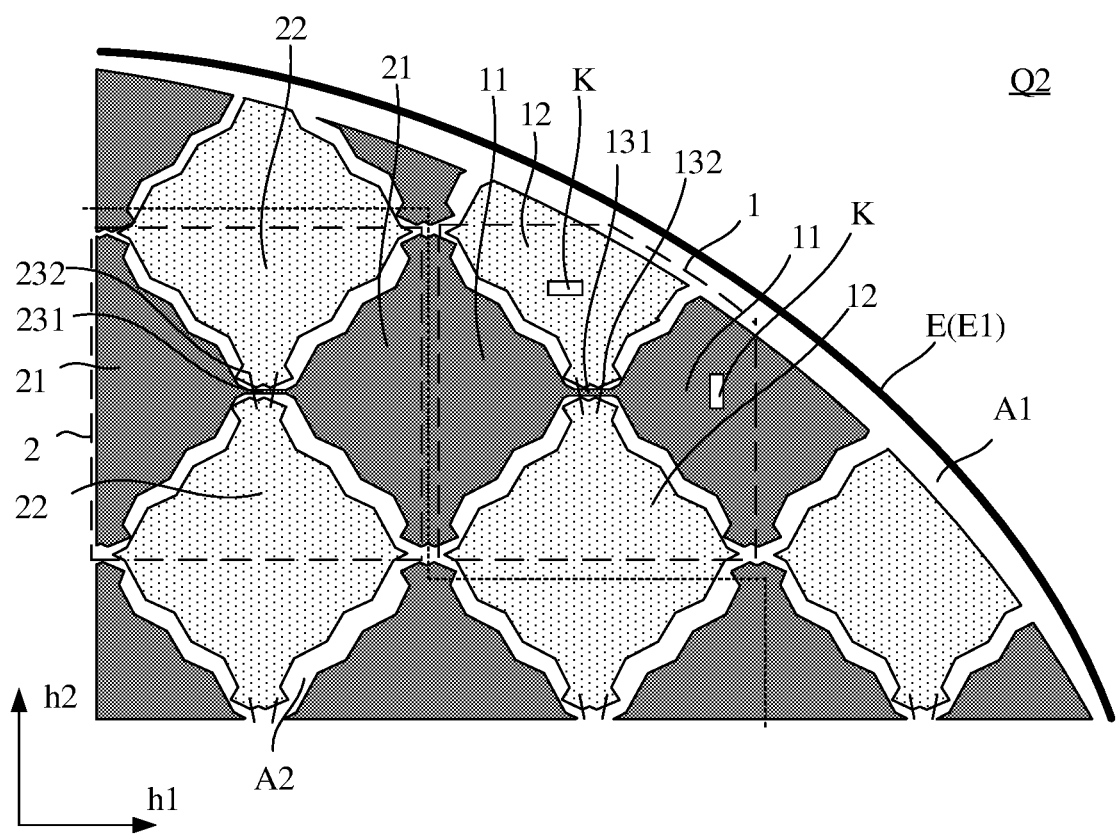
FIG. 4 is a schematic enlarged view of a region Q2 in FIG. 2 according to an embodiment of the present disclosure.

FIG. 3 is a schematic enlarged view of a region Q1 in FIG. 1. FIG. 4 is a schematic enlarged view of a region Q2 in FIG. 2. As shown in FIG. 3 and FIG. 4, the touch display panel 100 further includes a first touch unit 1 located in the first region A1 and second touch units 2 located in the second region A2. The second touch units 2 are arranged in a matrix in a first direction h1 and a second direction h2, such that the second touch units 2 spreads in the entire second region A2. That is, the second touch unit 2 is a minimum unit in the second region A2. The first direction h1 intersects the second direction h2.

In some embodiments, as shown in FIG. 3 and FIG. 4, an area of an orthographic projection of the first touch unit 1 on a plane of the touch display panel 100 is smaller than an area of an orthographic projection of the second touch unit 2 on the plane of the touch display panel 100. Exemplarily, the first touch unit 1 may be regarded as a structure obtained by cutting off the second touch unit 2. In some embodiments, in the first direction h1, a length of the first touch unit 1 is smaller than a length of the second touch unit 2; and/or, in the second direction h2, a length of the first touch unit 1 is smaller than a length of the second touch unit 2.

In embodiments of the present disclosure, an absolute value of a difference between an impedance R1 of the first touch unit 1 and an impedance R2 of the second touch unit 2 is smaller than a first preset threshold A.

In the touch display panel 100 provided by the embodiments of the present disclosure, the area of the first touch unit 1 is smaller than the area of the second touch unit 2, which can be adapted to the design of the touch display panel 100 with different shape requirements.

In some embodiments, the shape of the touch display panel 100 is designed as an irregular shape to improve the screen-to-body ratio of the touch display panel 100. The screen-to-body ratio is the proportion of the display area of the touch display panel 100 to the front area of the entire display panel. As shown in FIG. 1, in embodiments of the present disclosure, the touch display panel 100 may be designed to have a rounded rectangular shape having rounded corners. In some embodiments, as shown in FIG. 2, the touch display panel 100 may be designed to have a circular shape. As shown in FIG. 1 and FIG. 2, the edge E of the touch display panel 100 includes an irregular-shaped edge $E_1$ with a non-straight shape, and the first region A1 may be located at a side of the second region A2 close to the irregular-shaped edge $E_1$ of the touch display panel 100. The edge of the first touch unit 1 may extend along the extending direction of the irregular-shaped edge $E_1$ of the touch display panel 100. When the touch display panel 100 is designed to have a rounded rectangle shape, as shown in FIG. 1, the first regions A1 are located at four corners of the touch display panel 100, respectively. When the touch display panel 100 is designed to have a circular shape, as shown in FIG. 2, the first regions A surround the second region A2.

In the manufacturing process, transporting process, and use of the touch display panel 100, the generation of static electricity is inevitable. After the electrostatic charges accumulate too much in the touch display panel 100, electrostatic discharge (ESD) phenomenon occurs. In the related art, the transient large current generated during electrostatic discharge causes a breakdown risk to the touch display panel 110. In order to enable the first touch unit 1 to match the shape requirement of the touch display panel 100, and according to embodiments of the present disclosure, the area of the orthographic projection of the first touch unit 1 on the plane of the touch display panel 100 is smaller than the area of the orthographic projection of the second touch unit 2 on the plane of the touch display panel 100. In embodiments of the present disclosure, the absolute value of the difference between the impedance R1 of the first touch unit 1 and the impedance R2 of the second touch unit 2 is smaller than a first preset threshold A, such that the electrostatic discharge current flowing through the first touch unit 1 is approximately equal to the electrostatic discharge current flowing through the second touch unit 2. In this way, it is avoided that a larger electrostatic discharge current flows through the first touch unit 1 having a smaller area, and thus avoids that the first touch unit 1 having a smaller area is the electrostatic weak point of the touch display panel, thereby improving the reliability of the touch display panel 100.

Exemplarily, the first preset threshold A is smaller than or equal to 5%*R2.

In some embodiments, the touch display panel 100 may employ a self-capacitance technology. In some embodiments, the touch display panel 100 may employ a mutual capacitance technology.

In the embodiments in which the touch display panel 100 employs the mutual capacitance technology, as shown in FIG. 3 and FIG. 4, the first touch unit 1 includes two first sensing electrodes 11 arranged in the first direction h1 and two first driving electrodes 12 arranged in the second direction h2. In the second direction h2, the two first sensing electrodes 11 are located between two adjacent first driving electrodes 12. In the first direction h1, and the two first driving electrodes 12 are located between two adjacent first sensing electrodes 11.

The second touch unit 2 includes two second sensing electrodes 21 arranged in the first direction h1 and two second driving electrodes 22 arranged in the second direction h2. In the first direction h1, the two second sensing electrodes 21 are located between two adjacent second driving electrodes 22. In the second direction h2, the two second driving electrodes 22 are located between two adjacent second sensing electrodes 21.

Exemplarily, as shown in FIG. 3 and FIG. 4, the first touch unit 1 also includes a first connection part 131 and a second connection part 132. The first connection part 131 electrically connects two adjacent first sensing electrodes 11, and the second connection part 132 electrically connects two adjacent first driving electrodes 12. The first connection part 131 and the second connection part 132 are insulated from each other and cross each other. That is, in a direction perpendicular to the plane of the touch display panel 100, the first connection part 131 and the second connection part 132 at least partially overlap with each other.

The second touch unit 2 also includes a third connection part 231 and a fourth connection part 232. The third connection part 231 electrically connects two adjacent second sensing electrodes 21, and the fourth connection part 232 electrically connects two adjacent second driving electrodes 22. The third connection part 231 and the fourth connection part 232 are insulated from each other and cross each other. That is, in the direction perpendicular to the plane of the touch display panel 100, the third connection part 231 and the fourth connection part 232 at least partially overlap each other.

Exemplarily, as shown in FIG. 3 and FIG. 4, for the first touch unit 1 and the second touch unit 2 that are arranged in the first direction h1, the first sensing electrode 11 of the first touch unit 1 is electrically connected to the second sensing electrode 21 of the second touch unit 2. For the first touch unit 1 and the second touch unit 2 that are arranged in the second direction h2, the first driving electrode 12 of the first touch unit 1 is electrically connected to the second driving electrode 22 of the second touch unit 2.

Exemplarily, as shown in FIG. 3, the touch display panel 100 also includes multiple touch sensing lines 31 and multiple touch driving lines 32. In some embodiments, the first driving electrode 12 and the second driving electrode 22 that are arranged in the second direction h2 are electrically connected to a same touch driving line 32, and the first sensing electrode 11 and the second sensing electrode 12 that are arranged in the first direction h1 are electrically connected to a same touch sensing line 31. The multiple touch sensing lines 31 and the multiple touch driving lines 32 are electrically connected to a touch controller chip (not shown).

When the touch display panel 100 is used for touch operation, the first driving electrode 12 and the second driving electrode 22 receive a touch driving signal provided by a touch chip through the touch driving line 32. The first driving electrode 12 and the first sensing electrode 11 form a mutual capacitance, and the second driving electrode 22 and the second sensing electrode 21 form a mutual capacitance. When an object, such as a finger touches, the first region A1, the capacitance between the first driving electrode 12 and the first sensing electrode 11 changes. When an object, such as a finger, touches the second region A2, the capacitance between the second driving electrode 22 and the second sensing electrode 21 changes. The first sensing electrode 11 and the second sensing electrode 21 transmit touch sensing signals to the touch chip through the touch sensing lines 31. Through analyzing the touch sensing signals, the touch chip may determine whether touch occurs on the touch display panel and recognize the touch position.

Exemplarily, as shown in FIG. 3, at least one of the multiple touch sensing lines 31 is electrically connected to the first sensing electrode 11 close to the edge E of the touch display panel 100, and at least one of the multiple touch driving lines 32 is electrically connected to the first driving electrode 12 close to the edge E of the touch display panel 100.

Exemplarily, as shown in FIG. 3, the shape of the edge of each of the first sensing electrode 11, the second sensing electrode 21, the first driving electrode 12 and the second driving electrode 22 is a straight line. In some embodiments, as show in FIG. 4, the shape of the edge of each of the first sensing electrode 11, the second sensing electrode 21, the first driving electrode 12 and the second driving electrode 22 is a broken line. Embodiments of the present disclosure do not limit the shapes of the edges of the first sensing electrode 11, the second sensing electrode 21, the first driving electrode 12 and the second driving electrode 22.

Exemplarily, the configuration that the area of the orthographic projection of the first touch unit 1 on the plane of the touch display panel 100 is smaller than the area of the orthographic projection of the second touch unit 2 on the plane of the touch display panel 100 includes at least one of the following two example configurations.

In a first example configuration, an area of an orthographic projection of each of at least one first sensing electrode 11 on the plane of the touch display panel 100 is smaller than an area of the orthographic projection of the second sensing electrode 21 on the plane of the touch display panel 100. In a second example configuration, an area of an orthographic projection of each of at least one first driving electrode 12 on the plane of the touch display panel 100 is smaller than an area of the orthographic projection of the second driving electrode 22 on the plane of the touch display panel 100.

FIG. 3 and FIG. 4 illustrate an example. In the example, the two second driving electrodes 22 in the second touch unit 2 have a same area, the two second sensing electrodes 21 have a same area, the area of one first sensing electrode 11 in the first touch unit 1 is equal to the area of the second sensing electrode 21, the area of the other first sensing electrode 11 in the first touch unit 1 is smaller than the area of the second sensing electrode 21, the area of one first driving electrode 12 in the first touch unit 11 is equal to the area of the second driving electrode 22, and the area of the other first driving electrode 12 in the first touch unit 11 is smaller than the area of the second driving electrode 22.

As shown in FIG. 3 and FIG. 4, the second sensing electrode 21 and the second driving electrode 22 each have an approximately-triangular shape, one first sensing electrode 11 and one first driving electrode 12 in the first touch unit 1 each have an approximately-triangular shape, the shape of the other first sensing electrode 11 is obtained by cutting off the triangular part, and the shape of the other first driving electrode 12 is obtained by cutting off the triangular part.

Exemplarily, the configuration that the absolute value of the difference between the impedance of the first touch unit 1 and the impedance of the second touch unit 2 is smaller than a first preset threshold includes at least one of the following two configurations. In the first configuration, the absolute value of the difference between the impedance of the first sensing electrode 11 and the impedance of the second sensing electrode 21 is smaller than the first preset threshold. In the second configuration, the absolute value of the difference between the impedance of the first driving electrode 12 and the impedance of the second driving electrode 22 is smaller than the first preset threshold.

As discussed above, the generation of static electricity is inevitable in the manufacturing process, transporting process and use of the touch display panel 100. After the electrostatic charges accumulate too much in the touch display panel 100, electrostatic discharge (ESD) phenomenon occurs. The transient large current causes a breakdown to the touch display panel. The inventors found that for the mutual capacitance touch display panel 100, the first connection part 131 and the second connect part 132 are insulated from each other and cross each other to form a parallel plate capacitor. When the electrostatic discharge causes a large voltage difference between the first connection part 131 and the second connection part 132, the intersecting position of the first connection part 131 and the second connection part 132 is easily broken down by static electricity, resulting in touch failure. In embodiments of the present disclosure, the impedance of the first sensing electrode 11 and/or the first driving electrode 12 that has a smaller area is increased, such that the absolute value of the impedance difference between the first sensing electrode 11 and the second sensing electrode 21 is smaller than the first preset threshold, and/or, the impedance difference between the first driving electrode 12 and the second driving electrode 22 is smaller than the first preset threshold. In this way, the risk of excessive electrostatic discharge current in the first sensing electrode 11 or the first driving electrode 12 is reduced. That is, the risk of excessive electrostatic discharge current in the first connection part 131 or the second connection part 132 is reduced. As a result, the voltage difference between the first connection part 131 and the second connection part 132 when the electrostatic discharge occurs is reduced, and the electrostatic breakdown of the parallel plate capacitor formed by the first connection part 131 and the second connection part 132 is avoided, thereby improving the electrostatic reliability of the touch display panel 100.

In some embodiments of the present disclosure, at least one of the first sensing electrode 11 or the first driving electrode 12 is provided with at least one hole. Exemplarily, among the two first sensing electrodes 11 and the two first driving electrodes 12 of the first touch unit 1, the first sensing electrode 11 having a smaller area and/or the first driving electrode 12 having a smaller area is provided with the hole. In this way, the impedance of the first sensing electrode 11 having a smaller area and/or the first driving electrode 12 having a smaller area is increased, such that the absolute value of the impedance difference between the first sensing electrode 11 and the second sensing electrode 21 is smaller than the first preset threshold, and/or, the impedance difference between the first driving electrode 12 and the second driving electrode 22 is smaller than the first preset threshold.

Figure 5:
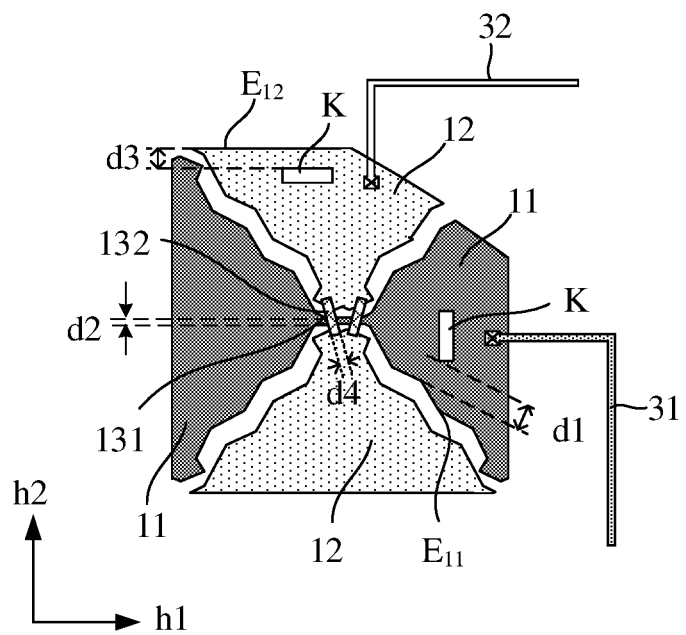
FIG. 5 is a schematic diagram illustrating a first touch unit, a touch sensing line and a touch driving line according to embodiments of the present disclosure.

FIG. 5 is a schematic diagram illustrating a first touch unit, a touch sensing line and a touch driving line according to embodiments of the present disclosure. FIG. 5 illustrates an example, in which the area of one first driving electrode 12 is equal to the area of the second driving electrode, and the area of the other first driving electrode 12 is smaller than the area of the second driving electrode, the area of one first sensing electrode 11 is equal to the area of the second sensing electrode, the area of the other sensing electrode 11 is smaller than the area of the second driving electrode, and the first driving electrode 12 having a smaller area and the first sensing electrode 11 having a smaller area each are provided with a hole K.

As shown in FIG. 5, the first sensing electrode 11 is electrically connected to the touch sensing line 31, and the first driving electrode 12 is electrically connected to the touch driving line 32. It should be understood that the first sensing electrode 11 may be regarded as a collection of multiple charge transport paths that are connected in parallel between the first connection part 131 and the touch sensing line 31, and the first driving electrode 12 may be regarded as a collection of multiple charge transport paths that are connected in parallel between the second connection part 132 and the touch driving line 32. As shown in FIG. 5, the first sensing electrode 11 with a smaller area has a length in the first direction h1 that is smaller than a length of the second sensing electrode in the first direction h1, and a length in the second direction h2 that is smaller than the length of the second sensing electrode in the second direction h2, and the first driving electrode 12 with a smaller area has a length in the first direction h1 that is smaller than a length of the second driving electrode in the first direction h1, and a length in the second direction h2 that is smaller than a length of the second driving electrode in the second direction h2. As a result, part of the charge transport paths in the first sensing electrode 11 with a smaller area and the first driving electrode 12 with a smaller area has a shorter length. In embodiments of the present disclosure, a part of the first sensing electrode 11 and/or a part of the first driving electrode 12 is cut off so as to form the hole K in the first sensing electrode 11 and/or the hole K in the first driving electrode 12, such that the number of the charge transport paths in the first sensing electrode 11 with a smaller area and/or the number of the charge transport paths in the first driving electrodes 12 with a smaller area is reduced. It is equivalent to reducing the number of parallel paths in the first sensing electrode 11 and/or the first driving electrode 12 with a smaller area, thereby increasing the resistance of the first sensing electrode 11 and/or the resistance of the first driving electrode 12. The problem of small impedance caused by the short charge transport path is remedied. Accordingly, the absolute value of the difference between the impedance of the first sensing electrode 11 with a smaller area and the impedance of the second sensing electrode 21 is smaller than the first preset threshold, and/or, the absolute value of the difference between the impedance of the first driving electrode 12 with a smaller area and the impedance of the second driving electrode 22 is smaller than the first preset threshold.

In some embodiments in which the first sensing electrode 11 having a smaller area is provided with the hole K, as shown in FIG. 5, the minimum distance between the edge $E_{11}$ of the first sensing electrode 11 and the hole K is d1, a width of the first connection part 131 is d2, the width of the first connection part 131 extends in a direction perpendicular to a direction along which two adjacent first sensing electrodes 11 are arranged, and d1 and d2 satisfy d1>d2. In embodiments of the present disclosure, the configuration where d1>d2 can ensure that the distance between the hole K and the edge $E_{11}$ of the first sensing electrode 11 is not too small, and thus can avoid a new electrostatic weak point formed between the hole K and the edge $E_{11}$ of the first sensing electrode 11.

In some embodiments in which the first driving electrode 12 having a smaller area is provided with the hole K, as shown in FIG. 5, a minimum distance d3 between the edge $E_{12}$ of the first driving electrode 12 and the hole K is d3 and a width d4 of the second connection part 132 satisfy d3>d4, and the width of the second connection part 132 extends in a direction perpendicular to the direction along which two adjacent first driving electrodes 12 are arranged. In embodiments of the present disclosure, the configuration where d3>d4 can ensure that the distance between the hole K and the edge $E_{12}$ of the first driving electrode 12 is not too small, and thus can avoid a new electrostatic weak point formed between the hole K and the edge $E_{12}$ of the first driving electrode 12.

In some embodiments, as shown in FIG. 3 and FIG. 5, each of the first connection part 131 and the second connection part 132 may have a same width at different positions. In some embodiments, each of the first connection part 131 and the second connection part 132 may have different widths at different positions. In the embodiments in which each of the first connection part 131 and the second connection part 132 may have different widths at different positions, the width d2 of the first connection part 132 refers to the minimum width of the first connection part 131, and the width d4 of the second connection part 132 refers to the minimum width of the second connection part 132.

In some embodiments of the present disclosure, the first sensing electrode 11 having a smaller area and/or the first driving electrode 12 having a smaller area may each be provided with at least two holes K, so as to expand the adjustable arrange of the impedance of the first sensing electrode 11 or the first driving electrode 12.

Figure 6:
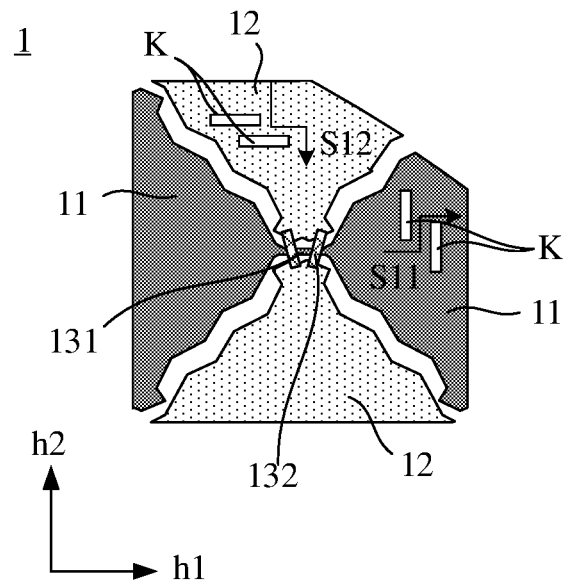
FIG. 6 is a schematic diagram of another first touch unit according to embodiments of the present disclosure.

FIG. 6 is a schematic diagram of another first touch unit according to embodiments of the present disclosure. In some embodiments, as shown in FIG. 6, two adjacent holes K at least partially overlap in the first direction h1. With this arrangement, when the electrostatic charge moves in the first sensing electrode 11, the electrostatic charge may encounter at least two holes K, such that the moving direction of the electrostatic charge changes for several times. This can increase the length of the moving path of the electrostatic charge in the first sensing electrode 11, and further increase the resistance of the first sensing electrode 11. The impedance of the first sensing electrode 11 can be fine-tuned. The path S11 in FIG. 6 denotes the moving path of the electrostatic charge encounter two holes K in the first sensing electrode 11. In addition, in some embodiments of the present disclosure, two adjacent holes K in the first sensing electrode 11 are configured to partially overlap in the first direction h1, such that the holes K are more evenly distributed in the first sensing electrode 11, which is conducive to improving the display consistency of different positions in the touch display panel 100.

In some embodiments, as shown in FIG. 6, two adjacent holes in the first driving electrode 12 at least partially overlap in the second direction h2. With such configuration, when the electrostatic charge moves in the first driving electrode 12, the electrostatic charge may encounter at least two holes K, such that the moving direction of the electrostatic charge changes for several times. This can increase the length of the moving path of the electrostatic charge in the first driving electrode 12, and further increase the resistance of the first driving electrode 12. The impedance of the first driving electrode 12 can be fine-tuned. The path S12 in FIG. 6 denotes the moving path of the electrostatic charge encounter two holes K in the first driving electrode 12. In addition, in some embodiments of the present disclosure, two adjacent holes K in the first driving electrode 12 are configured to partially overlap in the second direction h2, such that the holes K are more evenly distributed in the first driving electrode 11, which is conducive to improving the display consistency of different positions in the touch display panel 100.

Figure 7:
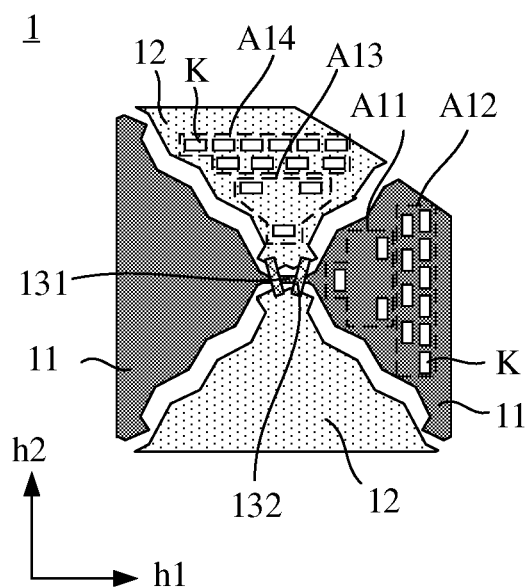
FIG. 7 is a schematic diagram of yet another first touch unit according to embodiments of the present disclosure.

FIG. 7 is a schematic diagram of yet another first touch unit 1 according to embodiments of the present disclosure. In some embodiments in which the first sensing electrode 11 includes multiple holes K, as shown in FIG. 7, the first sensing electrode 11 has a first sub-region A11 and a second sub-region A12 located at a side of the first sub-region A11 away from the first connection part 131. A density of the holes K in the first sub-region A11 is smaller than the density of the holes K in the second sub-region A12. With such configuration, the density of the holes K in the region near the first connection part 131 is small, such that the environment around the first connection part 131 and the environment around the third connection part 231 in the second touch unit 2 are consistent, thereby improving the display consistency of different positions in the touch display panel 100.

In some embodiments in which the first driving electrode 12 includes multiple holes K, as shown in FIG. 7, the first driving electrode 12 has a third sub-region A13 and a fourth sub-region A14 located at a side of the third sub-region A13 away from the second connection part 132. The density of the holes K in the third sub-region A13 is smaller than the density of the holes K in the fourth sub-region A14. With such arrangement, the density of the holes K in the region near the second connection part 132 is small, such that the environment around the second connection part 132 and the environment around the fourth connection part 232 in the second touch unit 2 are consistent, thereby improving the display consistency of different positions in the touch display panel 100.

In some embodiments of the present disclosure, as shown in FIG. 5, FIG. 6 and FIG. 7, for the arrangement of the hole K, the hole K may be arranged in the interior of the first sensing electrode 11 and/or the interior of the first driving electrode 12. That is, the hole K in the first sensing electrode 11 is surrounded by the edge of the first sensing electrode 11, and the hole K in the first driving electrode 12 is surrounded by the edge of the first driving electrode 12. With such configuration, tip structures space apart by the hole K and formed at the edge of the first sensing electrode 11 and/or the first driving electrode 12 is avoided, and the occurrence possibility of the tip discharge at the edge of the first sensing electrode 11 and/or the first driving electrode 12 is reduced, thereby further improving the reliability of the touch display panel.

Exemplarily, the shape of the hole K includes a circular shape or a polygonal shape. FIG. 5, FIG. 6, and FIG. 7 illustrate an example in which the hole K has a quadrilateral shape.

Figure 8:
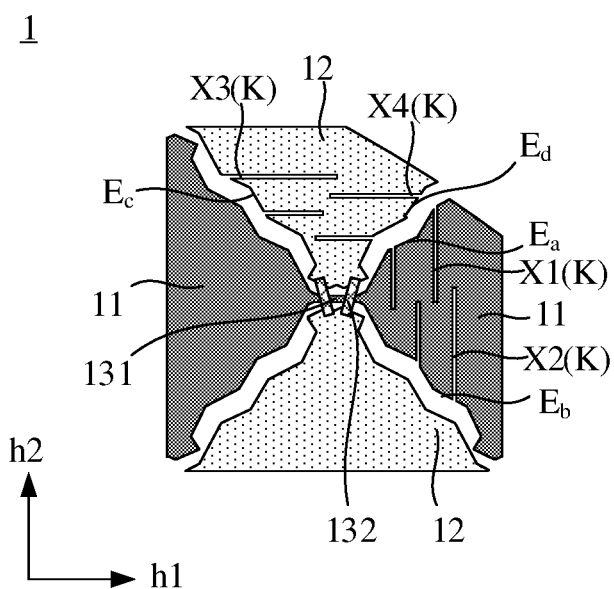
FIG. 8 is a schematic diagram of yet another first touch unit according to embodiments of the present disclosure.

FIG. 8 is a schematic diagram of yet another first touch unit according to embodiments of the present disclosure. In some embodiments, as shown in FIG. 8, in the first sensing electrode 11, the hole K extends from the edge of the first sensing electrode 11 to the interior of the first sensing electrode 11 to form a slit. The slit can increase the impedance of the first sensing electrode 11. Exemplarily, the length of the slit is greater than the width of the slit. The width direction is perpendicular to the extending direction of the slit.

Exemplarily, the shape of the slit includes any one of the following: a straight line, a polyline, or an arc line. FIG. 8 illustrates an example in which the slit is arranged to have a straight line shape.

Exemplarily, as shown in FIG. 8, the first sensing electrode 11 includes a first edge $E_a$ and a second edge $E_b$ that are opposite to each other in the second direction h2. In some embodiments, the first sensing electrode 11 is provided with multiple slits, and the multiple slits include a first slit X1 and a second slit X2. The first slit X1 extends from the first edge $E_a$ to the interior of the first sensing electrode 11, and the second slit X2 extends from the second edge $E_b$ to the interior of the first sensing electrode 11. The first slit X2 and the second slit X2 at least partially overlap in the first direction h1. In this way, the impedance of the first sensing electrode 11 can be fined tuned, and the first slit X1 and the second slit X2 are more evenly distributed in the first sensing electrode 11, thereby improving the display uniformity of the touch display panel.

Exemplarily, as shown in FIG. 8, the first driving electrode 12 includes a third edge $E_c$ and a fourth edge $E_d$ that are opposite to each other in the first direction h1. In some embodiments in which the first driving electrode 12 is provided with multiple slits X, the multiple slits X include a third slit X3 and a fourth slit X4. The third slit X3 extends from the third edge $E_c$ to the interior of the first driving electrode 12, and the fourth slit X4 extends from the fourth edge $E_d$ to the interior of the first driving electrode 12. The third slit X3 and the fourth slit X4 at least partially overlap in the second direction h2. In this way, the impedance of the first driving electrode 12 can be fined tuned, and the third slit X3 and the fourth slit X4 are more evenly distributed in the first driving electrode 12, thereby improving the display uniformity of the touch display panel.

In some embodiments, the first sensing electrode 11 and the second sensing electrode 21 may be arranged in the same layer, such that the first sensing electrode 11 and the second sensing electrode 21 are formed through the same patterning process, thereby simplifying the manufacturing process of the touch display panel 100.

In some embodiments, the first sensing electrode 11, the second sensing electrode 21, the first driving electrode 12 and the second driving electrode 22 may be arranged in the same layer.

Figure 9:
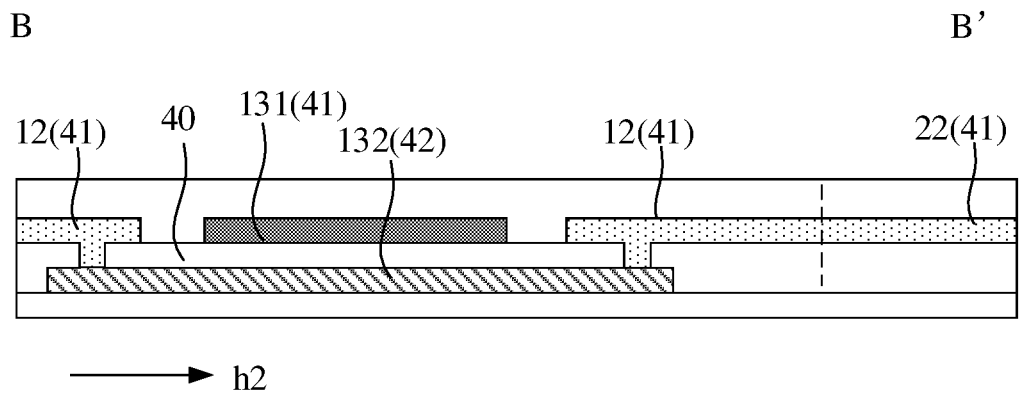
FIG. 9 is a cross-sectional view along line BB' in FIG. 3 according to an embodiment of the present disclosure.
Figure 10:
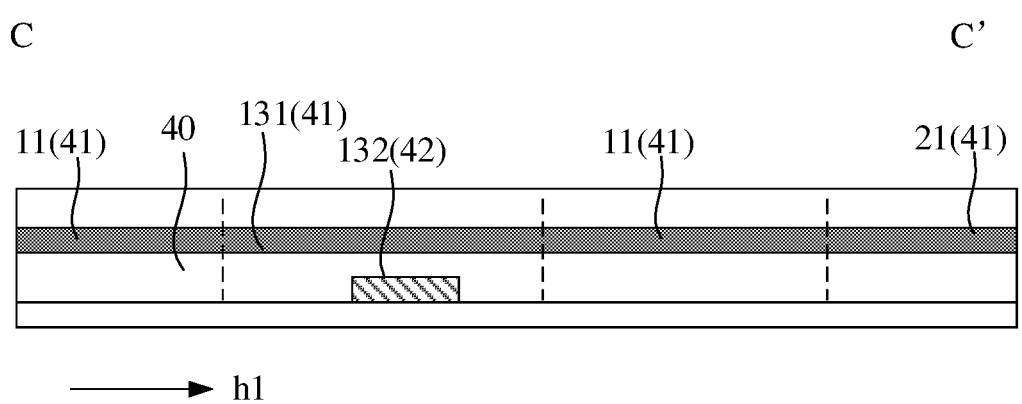
FIG. 10 is a cross-sectional view along line CC' in FIG. 3 according to an embodiment of the present disclosure.

FIG. 9 is a cross-sectional view along line BB' in FIG. 3. FIG. 10 is a cross-sectional view along line CC' in FIG. 3. As shown in FIG. 9 and FIG. 10, the touch display panel 100 further includes a first touch conductive layer 41, a second touch conductive layer 42 and a touch insulation layer 40. The touch insulation layer 40 is located between the first touch conductive layer 41 and the second touch conductive layer 42. The first sensing electrode 11, the first driving electrode 12, the first driving electrode 12 and the first connection part 131 are all arranged in the first touch conductive layer 41, and the second connection part 132 is arranged in the second touch conductive layer 42 that is different from the first touch conductive layer 41.

In some embodiments, the second sensing electrode 21, the second driving electrode 22 and the third connection part (not shown in FIG. 9 and FIG. 10) are all arranged in the first touch conductive layer 41, and the fourth connection part (not shown in FIG. 9 and FIG. 10) is arranged in the second touch conductive layer 42 that is different from the first touch conductive layer 41.

In some embodiments, the first sensing electrode 11, the second sensing electrode 21, the first connect part 131, the first driving electrode 12, the second driving electrode 22, and the third connection part may be formed by the same patterning process. Exemplarily, the first sensing electrode 11, the second sensing electrode 21, the first connect part 131, the first driving electrode 12, the second driving electrode 22, and the third connection part are made of a same material and have a same thickness.

Exemplarily, the first touch conductive layer 41 includes a transparent metal oxide layer. In some embodiments, the first touch conductive layer 41 includes any one of indium tin oxide, indium zinc oxide, or indium gallium zinc oxide.

In some embodiments, the second touch conductive layer 42 includes a metal layer.

As shown in FIG. 3, FIG. 4 and FIG. 10, in the first direction h1, the first sensing electrode 11 in the first touch unit 1 away from the edge of the touch display panel 100 and the second sensing electrode 21 adjacent to the first sensing electrode 11 form an electrode block, and the electrode block may be in an integral structure. That is, there is no interface between the first sensing electrode 11 and its adjacent second sensing electrode 21. As shown in FIG. 3, the electrode block has a quadrilateral shape.

As shown in FIG. 3, FIG. 4 and FIG. 9, in the second direction h2, the first driving electrode 12 in the first touch unit 1 away from the edge of the touch display panel 100 and the second driving electrode 22 adjacent to the first driving electrode 12 form an electrode block, and the electrode block may be in an integral structure. That is, there is no interface between the first driving electrode 12 and its adjacent second driving electrode 22. As shown in FIG. 3, the electrode block has a quadrilateral shape.

In some embodiments, a conductivity of the first sensing electrode 11 is smaller than a conductivity of the second sensing electrode 21; and/or a conductivity of the first driving electrode 12 is smaller than a conductivity of the second driving electrode 22. Exemplarily, among the two first sensing electrodes 11 and the two first driving electrodes 12 of the first touch unit 1, the conductivity of the first sensing electrode 11 having a smaller area is smaller than the conductivity of the second sensing electrode 21, and/or, the thickness of the first sensing electrode 11 having a smaller area is smaller than the thickness of the second sensing electrode 21. With such arrangement, the impedance of the first sensing electrode 11 having a smaller area is substantially equal to the impedance of the second sensing electrode 21 having a larger area. With such arrangement, in some embodiments of the present disclosure, the first sensing electrode 11 is not provided with the hole. In some other embodiments, the first sensing electrode 11 and the second sensing electrode 21 are designed to have different conductivities and/or thicknesses, and the first sensing electrode 11 is provided with one or more holes, such that the impedance of the first sensing electrode 11 having a smaller area is increased in multiple aspects.

In some embodiments, q conductivity of the first driving electrode 12 having a smaller area is smaller than a conductivity of the second driving electrode 22; and/or, a thickness of the first driving electrode 12 having a smaller area is smaller than a thickness of the second driving electrode 22. With such arrangement, the impedance of the first driving electrode 12 having a smaller area is substantially equal to the impedance of the second t driving electrode 22 having a larger area. With such arrangement, in some embodiments of the present disclosure, the first driving electrode 12 is not provided with the hole. In some other embodiments, the first driving electrode 12 and the second driving electrode 22 are designed to have different conductivities and/or thicknesses, and the first driving electrode 12 is provided with one or more holes, such that the impedance of the first driving electrode 12 having a smaller area is increased in multiple aspects.

Figure 11:
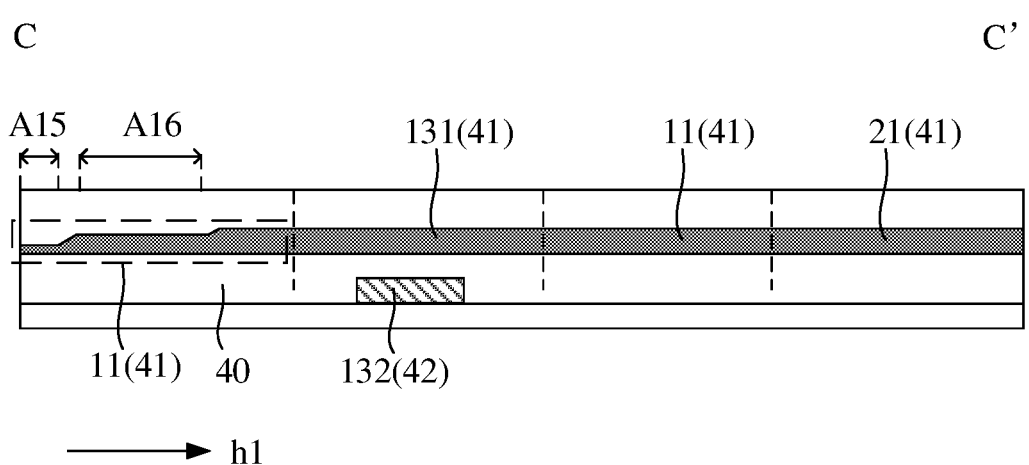
FIG. 11 is another cross-sectional view along line CC' in FIG. 3 according to an embodiment of the present disclosure.

FIG. 11 is another cross-sectional view along line CC' in FIG. 3. When adjusting the thickness of the first sensing electrode 11 having a smaller area, exemplarily, as shown in FIG. 11, the first sensing electrode 11 includes a fifth sub-region A15 and a sixth sub-region A16. The thickness of the fifth sub-region A15 is smaller than the thickness of the sixth sub-region A16, and the thickness of the fifth sub-region A15 is smaller than the thickness of the second sensing electrode 21. In embodiments of the present disclosure, the first sensing electrode 11 has multiple sub-regions having different thicknesses, and the fifth sub-region A15 of the first sensing electrode 11 is smaller than the thickness of the second sensing electrode 21, such that the difference between the impedance of the first sensing electrode 11 having a smaller area and the impedance of the second sensing electrode 21 having a larger area stratifies the above first preset threshold. In addition, with such arrangement, the thicknesses of different sub-regions of the first sensing electrode 11 can be flexibly adjusted, which is conducive to fine tuning of the impedance of the first sensing electrode 11.

Exemplarily, as shown in FIG. 11, the distance between the fifth sub-region A15 and the first connection part 131 is greater than the distance between the sixth sub-region A16 and the first connection part 131. In some embodiments, in a direction from the first connection part 131 to the first sensing electrode 11, the thickness of the first sensing electrode 11 gradually decreases, and the maximum thickness of the first sensing electrode 11 is equal to the thickness of the first connection part 131. In some embodiments, the thickness of the first connection part 131, the thickness of the third connection part (not shown in FIG. 11), and the thickness of the second sensing electrode 21 are equal. With such arrangement, the environment around the first connection part 131 and the environment around the third connection part are consistent, thereby improving the display consistency of different positions in the touch display panel 100.

When adjusting the thickness of the first driving electrode 12 having a smaller area, the first driving electrode 12 is arranged to have multiple sub-regions having different thicknesses, and in the direction from the second connection part 132 to the first driving electrode 12, the thickness of the first driving electrode 12 gradually decreases. Exemplarily, in some embodiments, the maximum thickness of the first driving electrode 12 is equal to the thickness of the fourth connection part 232, such that the environment around the second connection part 132 and the environment around the fourth connection part 232 are consistent, thereby improving the display consistency of different positions in the touch display panel 100.

Figure 12:
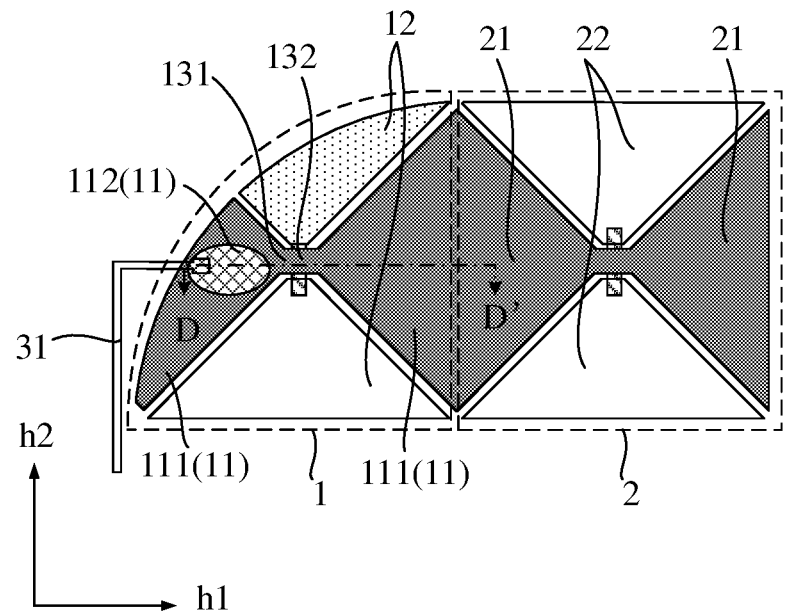
FIG. 12 is a schematic diagram illustrating yet another first touch unit and a second touch unit according to embodiments of the present disclosure.
Figure 13:
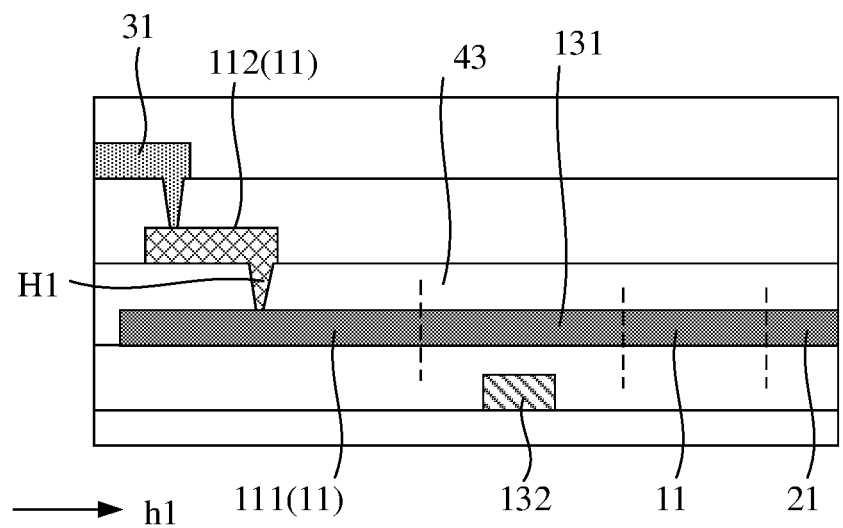
FIG. 13 is a cross-sectional view along line DD' in FIG. 12 according to an embodiment of the present disclosure.

FIG. 12 is a schematic diagram illustrating yet another first touch unit 1 and a second touch unit 2 according to embodiments of the present disclosure. FIG. 13 is a cross-sectional view along line DD' in FIG. 12. In some embodiments, the first sensing electrode 11 having a smaller area is arranged to include a first sub-electrode 111 and a second sub-electrode 112 that are stacked. An area of the orthographic projection of the first sub-electrode 111 on the plane of the touch display panel is smaller than an area of the orthographic projection of the second sensing electrode 21 on the plane of the touch display panel, and an area of the orthographic projection of the second sub-electrode 112 on the plane of the touch display panel is smaller than the area of the orthographic projection of the second sensing electrode 21 on the plane of the touch display panel. The first sub-electrode 111 and the second sub-electrode 112 are electrically connected to each other, and are arranged in different layers.

As shown in FIG. 13, in the direction perpendicular to the plane of the touch display panel 100, a first insulation layer 43 is arranged between the first sub-electrode 111 and the second sub-electrode 112. The first insulation layer 43 includes a first via H1, and the first sub-electrode 111 and the second sub-electrode 112 are electrically connected through the first via H1. Exemplarily, in some embodiments of the present disclosure, the first sub-electrode 111 and the first connection part 131 are arranged in the same layer, and the second sub-electrode 112 and the first connection part 131 are arranged in different layers.

Exemplarily, in some embodiments of the present disclosure, one of the first sub-electrode 111 and the second sub-electrode 112 is electrically connected to the touch sensing line 31, and the other one is electrically connected to the first connection part 131. As shown in FIG. 13, one end of the second sub-electrode 112 is electrically connected to the touch sensing line 31, and another end of the second sub-electrode 112 is electrically connected to the first sub-electrode 111. The first sub-electrode 111 is further electrically connected to the first connection part 131. That is, the first sub-electrode 111 and the second sub-electrode 112 are connected in series between the touch sensing line 31 and the first connection part 131. With such arrangement, the transport path of the current between the touch sensing line 31 and the first connection part 131 is increased, such that the impedance of the first sensing electrode 11 including the first sub-electrode 111 and the second sub-electrode 112 is substantially equal to the impedance of the second sensing electrode 21 having a larger area.

In some embodiments, as shown in FIG. 12, the area of the second sub-electrode 112 is smaller than the area of the first sub-electrode 111, and the orthographic projection of the second sub-electrode 112 on the plane of the first sub-electrode 111 is within the first sub-electrode 111. With such arrangement, it is avoided that the first sub-electrode 111 and the second sub-electrode 112 occupy more space in the touch display panel 100, and ensures that the touch display panel 100 is designed according to the required shape.

In some embodiments, at least one of the first sub-electrode 111 and the second sub-electrode 112 is provided with a hole, such that the number of the charge transport paths in the first sub-electrode 111 or the second sub-electrode 112 is reduced, and the impedance of the first sensing electrode 11 is increased. The arrangement of the holes in the first sub-electrode 111 and the second sub-electrode 112 is same as that in the first sensing electrode 11, and is not repeated herein.

In some embodiments, a conductivity of at least one of the first sub-electrode 111 and the second sub-electrode 112 is smaller than the conductivity of the second sensing electrode 21. Exemplarily, the conductivity of the first sub-electrode 111 is equal to the conductivity of the second sensing electrode 21, and the conductivity of the second sub-electrode 121 is smaller than the conductivity of the second sensing electrode 21.

In some embodiments, at least one of the first sub-electrode 111 and the second sub-electrode 112 each has a thickness smaller than the thickness of the second sensing electrode 21. Exemplarily, the thickness of the first sub-electrode 111 is equal to the thickness of the second sensing electrode 21, and the thickness of the second sub-electrode 112 is smaller than the thickness of the second sensing electrode 21.

Exemplarily, as shown in FIG. 13, in some embodiments, the first sub-electrode 111 and the second sensing electrode 21 may arranged in the same layer, and formed by the same patterning process, thereby simplifying the manufacturing process of the touch display panel 100.

Figure 14:
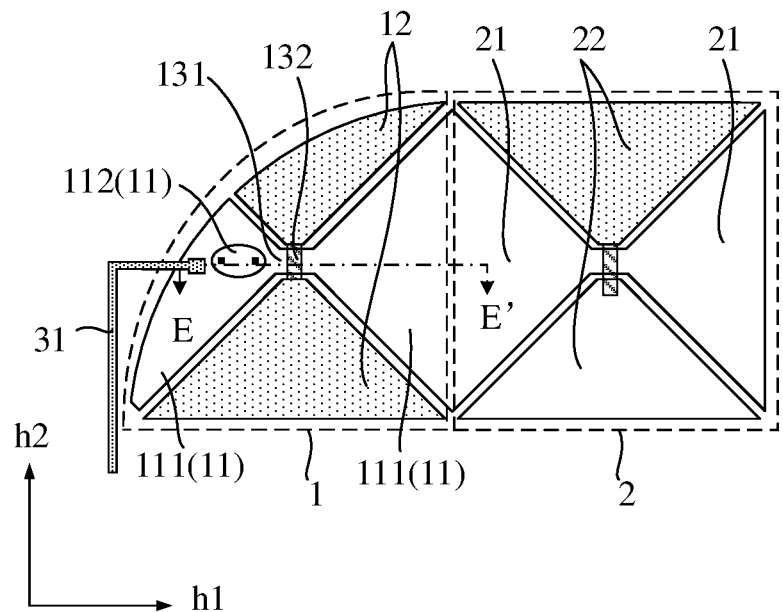
FIG. 14 is a schematic diagram illustrating yet another first touch unit and a second touch unit according to embodiments of the present disclosure.
Figure 15:
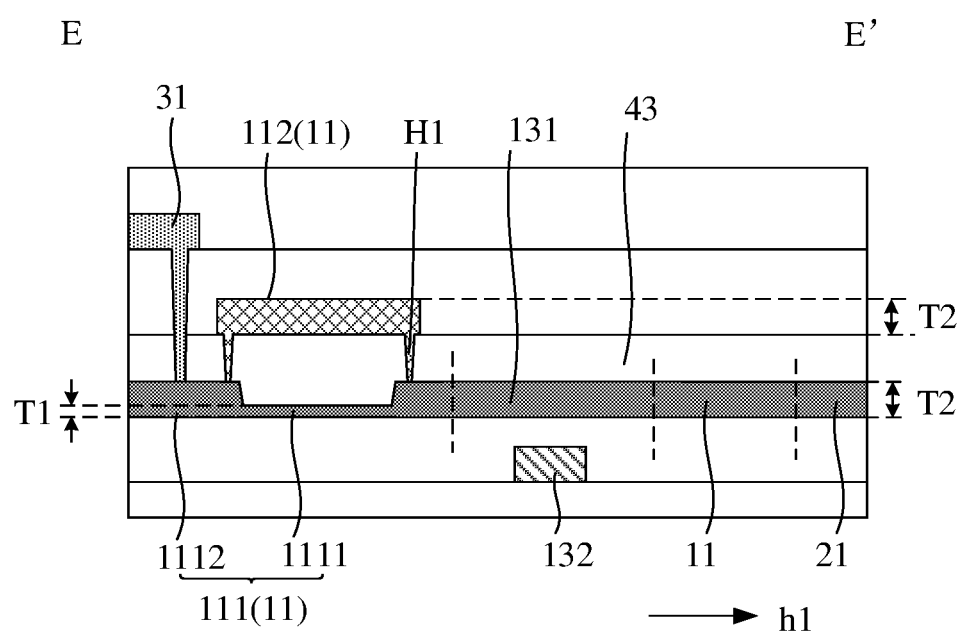
FIG. 15 is a cross-sectional view along line EE' in FIG. 14 according to an embodiment of the present disclosure.

FIG. 14 is a schematic diagram illustrating yet another first touch unit and a second touch unit according to embodiments of the present disclosure. FIG. 15 is a cross-sectional view along line EE' in FIG. 14. FIG. 14 and FIG. 15 illustrate an example in which both the touch sensing line 31 and the first connection part 131 are electrically connected to the first sub-electrode 111. In some embodiments, as shown in FIG. 14 and FIG. 15, the first sub-electrode 111 includes an overlapping part 1111 and a non-overlapping part 1112. In the direction perpendicular to the plane of the touch display panel, the overlapping part 1111 overlaps the second sub-electrode 112, and the non-overlapping part 1112 does not overlap the second sub-electrode 112.

Exemplarily, in some embodiments, at least one of the second sub-electrode 112 and the overlapping part 1111 each has a thickness smaller than the thickness of the second sensing electrode 21, and/or, at least one of the second sub-electrode 112 and the overlapping part 1111 each has a conductivity smaller than the conductivity of the second sensing electrode 21. As shown in FIG. 15, for illustration, the thicknesses of the non-overlapping part 1112, the second sub-electrode 1112 and the second sensing electrode 21 are all T2, the thickness of the overlapping part 1111 is T1, and T1 and T2 satisfy T1<T2. With such arrangement, the absolute value of the difference between the impedance of the first sensing electrode 11 and the impedance of the second sensing electrode 21 is smaller than or equal to the first preset threshold.

Exemplarily, as shown in FIG. 15, in some embodiments, both the overlapping area 1111 and the non-overlapping area 1112 are arranged in the same layer as the second sensing electrode 21, and the overlapping area 1111, the non-overlapping area 1112 and the second sensing electrode 21 are made through the same patterning process.

Figure 16:
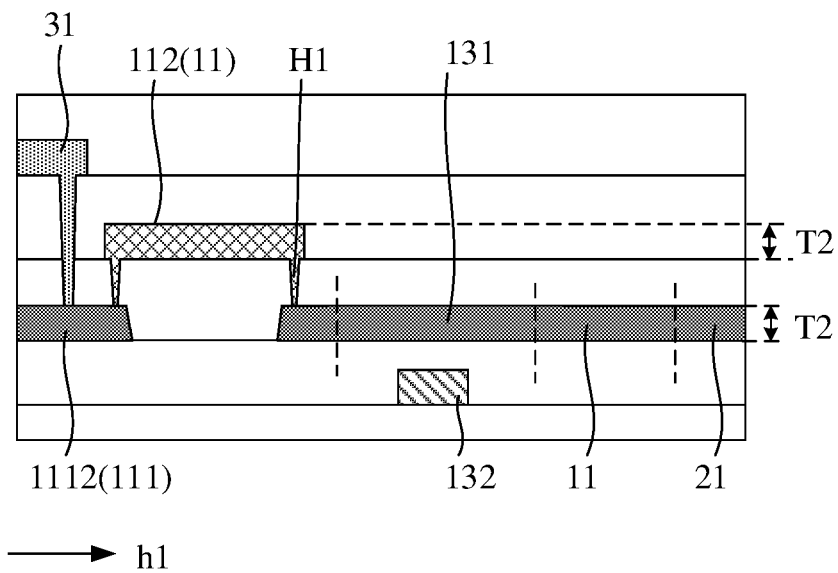
FIG. 16 is a schematic diagram illustrating yet another first touch unit and a second touch unit according to embodiments of the present disclosure.

FIG. 16 is a schematic diagram illustrating yet another first touch unit and a second touch unit according to embodiments of the present disclosure. In some embodiments, as shown in FIG. 16, the overlapping part is not provided, that is, the first sub-electrode 111 is provided with a hole. In the direction perpendicular to the plane of the touch display panel 100, the hole overlaps the second sub-electrode 112, such that the absolute value of the difference between the impedance of the first sensing electrode 11 and the impedance of the second sensing electrode 21 is smaller than or equal to the first preset threshold.

Exemplarily, when the area of the first driving electrode 12 is smaller than the area of the second driving electrode 22, in some embodiments, the first driving electrode 12 is arranged to include at least two sub-electrodes that are stacked, and the arrangement of the sub-electrodes is the same as the arrangement of the sub-electrodes in the first sensing electrode 11, which is not repeated herein.

Exemplarily, in some embodiments, the conductivity of the first connection part 131 and the conductivity of the second connection part 132 in the first touch unit 1 are the same, such that the static electricity flowing through the first connection part 131 and the static electricity of a same intensity and flowing through the second connection part 132 generate the same transient voltage. In this way, an oversized voltage difference generated between the first connection part 131 and the second connection part 132 is avoided, and thus it is avoided that the first connection part 131 and the second connection part 132 are damaged by static electricity, ensuring the reliability of the touch display panel 100.

In some embodiments, the first connection part 131 and the second connection part 132 are made of the same material. For example, both the first connection part 131 and the second connection part 132 include transparent oxide or metal material.

Exemplarily, the touch display panel 100 may include multiple first touch units 1 each of which is adjacent to the edge E of the touch display panel 100. The area of the orthographic projection of each first touch unit 1 on the plane of the touch display panel 100 is smaller than the area of the orthographic projection of the second touch unit 2 on the plane of the touch display panel 100. The absolute value of the impedance difference between two of at least two first touch units 1 is smaller than a second preset threshold. With such arrangement, the impedances of different first touch units 1 are impedance equal, and thus it is avoided that a certain first touch unit 1 becomes the electrostatic weak point of the touch display panel 100, thereby improving the electrostatic reliability of the entire touch display panel 100.

Exemplarily, the second preset threshold is equal to the first preset threshold.

Exemplarily, as shown in FIG. 3, the touch display panel 100 further includes a shielding line 30. The shielding line 30 is located between the touch sensing line 31 and the touch driving line 32. The shielding line 30 includes a conductive material. The shielding line 30 is insulated from both the touch sensing line 31 and the touch driving line 32. Exemplarily, the shielding line 30 transmits a constant signal. The arrangement of the shielding line 30 can reduce the mutual interference between the touch sensing line 31 and the touch driving line 32 that transmit different signals. In this way, the accuracy of the signals transmitted on the touch sensing line 31 and the touch driving line 32 is increased, thereby improving the accuracy of the touch operation.

As shown in FIG. 3, the shielding line 30 terminates a position corresponding to the boundary between the first sensing electrode 11 and the first driving electrode 12. In some embodiments, the configuration the shielding line 30 terminates a position corresponding to the boundary between the first sensing electrode 11 and the first driving electrode 12 refers to that the minimum distance between the shielding line 30 and the boundary position of the first sensing electrode 11 and the first driving electrode 12 is smaller than the minimum distance between the shielding line 30 and the first sensing electrode 11, and the minimum distance between the shielding line 30 and the boundary position of the first sensing electrode 11 and the first driving electrode 12 is smaller than the minimum distance between the shielding line 30 and the first driving electrode 12.

In some embodiments, as shown in FIG. 3, the touch display panel 100 further includes a ground signal line 5. The ground signal line 5 is configured to conduct the static electricity in the touch display panel 100 in time, reducing the impact of static electricity on the electronic structure in the touch display panel 100. Exemplarily, as shown in FIG. 3, the ground signal line 5 is located between the touch sensing line 31 and the edge E of the touch display panel 100, or the ground signal line 5 is located between the touch driving line 32 and the edge of the touch display panel 100.

Figure 17:
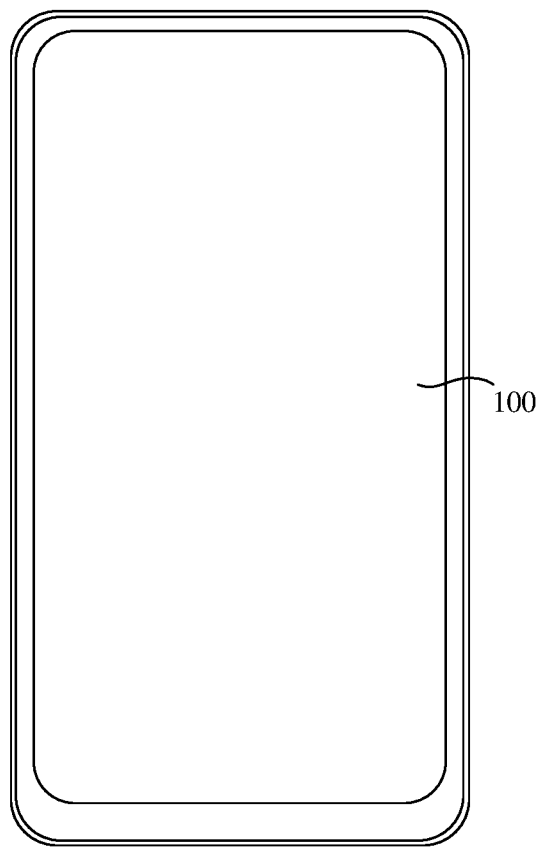
FIG. 17 is a schematic diagram of a touch display device according to embodiments of the present disclosure.

Some embodiments of the present disclosure provide a touch display device. FIG. 17 is a schematic diagram of a touch display device provided by some embodiments of the present disclosure. As shown in FIG. 17, the touch display device includes a touch display panel 100 provided by any embodiment of the present disclosure. The structure of the touch display panel 100 has been described in the above embodiments and will not be repeated herein. It should be noted that, the display device shown in FIG. 17 is merely schematic, and the display device may be any electronic device with a display function, such as a mobile phone, a tablet computer, a notebook computer, an e-book, or a television.

The above only illustrates some embodiments and does not limit the technical solution of the present disclosure. Any modification, equivalent replacement, improvement, etc. made within the principle of this disclosure shall fall within the scope of disclosure.

What is claimed is:

1. A touch display panel, the touch display panel having a first region and a second region, wherein the first region is located at a side of the second region close to an edge of the touch display panel; and wherein the touch display panel comprises a first touch unit located in the first region, and a plurality of second touch units located in the second region, wherein the plurality of second touch units is arranged in a matrix in a first direction and a second direction, the first direction intersecting the second direction, and wherein an area of an orthographic projection of the first touch unit on a plane of the touch display panel is smaller than an area of an orthographic projection of one second touch unit of the plurality of second touch units on the plane of the touch display panel, and an absolute value of a difference between an impedance of the first touch unit and an impedance of the one second touch unit is smaller than a first preset threshold.

2. The touch display panel according to claim 1, wherein the first touch unit comprises two adjacent first sensing electrodes arranged in the first direction, and two adjacent first driving electrodes arranged in the second direction, wherein the two adjacent first sensing electrodes are located between the two adjacent first driving electrodes in the second direction; and the two adjacent first driving electrodes are located between the two adjacent first sensing electrodes in the first direction;

wherein one of the plurality of second touch units comprises two adjacent second sensing electrodes arranged in the first direction, and two adjacent second driving electrodes arranged in the second direction, wherein the two adjacent second sensing electrodes are located between the two driving electrodes in the second direction; and the two adjacent second driving electrodes are located between the two adjacent second sensing electrodes in the first direction;

wherein an area of an orthographic projection of each of at least one of the two adjacent first driving electrodes on the plane of the touch display panel is smaller than an area of an orthographic projection of one of the two adjacent second driving electrodes on the plane of the touch display panel; and/or wherein an area of an orthographic projection of each of at least one of the two adjacent first sensing electrodes is smaller than an area of an orthographic projection of one of the two adjacent second sensing electrodes on the plane of the touch display panel; and wherein an absolute value of a difference between an impedance of one of the two adjacent first sensing electrodes and an impedance of one of the two adjacent second sensing electrodes is smaller than the first preset threshold, and an absolute value of a difference between an impedance of one of the two adjacent first driving electrodes and an impedance of one of the two adjacent second driving electrodes is smaller than the first preset threshold.

3. The touch display panel according to claim 2, wherein at least one of one first driving electrode of the two adjacent first driving electrodes or one first sensing electrode of the two adjacent first sensing electrodes comprises at least one hole.

4. The touch display panel according to claim 3, wherein the one first sensing electrodes comprises the at least one hole, wherein the at least one hole comprises at least two holes, wherein two adjacent holes of the at least two holes at least partially overlap in the first direction.

5. The touch display panel according to claim 3, wherein the one first sensing electrode comprises the at least one hole; and wherein the first touch unit further comprises a first connection part and a second connection part, wherein the first connection part connects the two adjacent first sensing electrodes, and the second connection part connects the two adjacent first driving electrodes; the first connection part and the second connection part are insulated from each other and cross each other; the first connection part and the two adjacent first sensing electrodes are located in a same layer; and a minimum distance d1 between an edge of the one first sensing electrode and one of the at least one hole, and a width d2 of the first connection part satisfy: d1>d2, wherein the width of the first connection part extends in a direction perpendicular to a direction along which the two adjacent first sensing electrodes are arranged.

6. The touch display panel according to claim 3, wherein the one first sensing electrode comprises the at least one hole, wherein the at least one hole comprises a plurality of holes;

wherein the first touch unit further comprises a first connection part and a second connection part, wherein the first connection part connects the two adjacent first sensing electrodes, and the second connection part connects the two adjacent first driving electrodes; the first connection part and the second connection part are insulated from each other, cross each other, and are arranged in a same layer;

wherein the one first sensing electrode has a first sub-region and a second sub-region located at a side of the first sub-region away from the first connection part; and wherein a density of at least one hole of the plurality of holes that is located in the first sub-region is smaller than a density of at least two holes of the plurality of holes that are located in the second sub-region.

7. The touch display panel according to claim 3, wherein the one first sensing electrode comprises the at least one hole, wherein the at least one hole is surrounded by an edge of the one first sensing electrode.

8. The touch display panel according to claim 7, wherein one of the at least one hole has a circular shape or a polygonal shape.

9. The touch display panel according to claim 3, wherein the one first sensing electrode comprises the at least one hole, wherein one of the at least one hole extends from an edge of the one first sensing electrode to an interior of the one first sensing electrode to form a slit.

10. The touch display panel according to claim 9, wherein the slit has a shape of a straight line, a broken line, or an arc.

11. The touch display panel according to claim 9, wherein the one first sensing electrode comprises a first edge and a second edge that are opposite to each other in the second direction; and wherein the at least one hole comprises at least two hole forming at least two slits, wherein the at least two slits comprise a first slit extending from the first edge to the interior of the one first sensing electrode, and a second slit extending from the second edge to the interior of the one first sensing electrode, wherein the first slit and the second slit at least partially overlap in the second direction.

12. The touch display panel according to claim 3, wherein the two adjacent first sensing electrodes and the two adjacent second sensing electrodes are arranged in a same layer.

13. The touch display panel according to claim 2, wherein a conductivity of one of the two adjacent first sensing electrodes is smaller than a conductivity of one of the second sensing electrodes, and/or a thickness of one of the two adjacent first sensing electrodes is smaller than a thickness of one of the two adjacent second sensing electrodes.

14. The touch display panel according to claim 13, wherein in a case where the thickness of the one of the two adjacent first sensing electrodes is smaller than the thickness of the one of the two adjacent second sensing electrodes, the one of the two adjacent first sensing electrodes comprises a fifth sub-region and a sixth sub-region, wherein a thickness of the fifth sub-region is smaller than a thickness of the sixth sub-region and smaller than the thickness of the one of the two adjacent second sensing electrodes.

15. The touch display panel according to claim 14, wherein the first touch unit further comprises a first connection part connecting the two adjacent first sensing electrodes, and a distance between the fifth sub-region and the first connection part is greater than a distance between the sixth sub-region and the first connection part.

16. The touch display panel according to claim 2, wherein one of the two adjacent first sensing electrodes comprises two sub-electrodes stacked in a direction perpendicular to the touch display panel,
   wherein a first insulation layer is arranged between the two sub-electrodes, and the two sub-electrodes are electrically connected to each other through a first via located in the first insulation layer; and
   wherein at least one of the two sub-electrodes each has a conductivity smaller than a conductivity of one of the two adjacent second sensing electrodes; and/or, at least one of the two sub-electrodes each has a thickness smaller than a thickness of one of the two adjacent second sensing electrodes; and/or, at least one of the two sub-electrodes each comprises a hole.

17. The touch display panel according to claim 16, wherein at least one of the two sub-electrodes is arranged in a same layer as the two adjacent second sensing electrodes.

18. The touch display panel according to claim 2, wherein the first touch unit further comprises a first connection part and a second connection part, wherein the first connection part is configured to connect the two adjacent first sensing electrodes, the second connection part is configured to connect the two adjacent first driving electrodes, and the first connection part and the second connection part are insulated from each other and cross each other; and
   wherein the first connection part and the second connection part at least partially overlap in a direction perpendicular to the plane of the touch display panel, and the first connection part and the second connection have a same conductivity.

19. The touch display panel according to claim 18, wherein the first connection part and the second connection part are made of a same material.

20. A touch display device, comprising a touch display panel, wherein the touch display panel has a first region and a second region, the first region being located at a side of the second region close to an edge of the touch display panel; and
   wherein the touch display panel comprises a first touch unit located in the first region, and a plurality of second touch units located in the second region, wherein the plurality of second touch units is arranged in a matrix in a first direction and a second direction, the first direction intersecting the second direction; and
   wherein an area of an orthographic projection of the first touch unit on a plane of the touch display panel is smaller than an area of an orthographic projection of one second touch unit of the plurality of second touch units on the plane of the touch display panel, and an absolute value of a difference between an impedance of the first touch unit and an impedance of the one second touch unit is smaller than a first preset threshold.

* * * * *